3,051,614
HEAVY OIL FOR TREE SPRAY
Paul F. Warner, Phillips, Tex., assignor to Phillips
Petroleum Company, a corporation of Delaware
No Drawing. Filed Mar. 30, 1959, Ser. No. 802,613
6 Claims. (Cl. 167—22)

This invention relates broadly to insecticidal compositions and, more specifically, the invention relates to oil-containing horticulture compositions which are sprayed on plants and trees for the purpose of controlling fungi and insects, especially mites, red spiders, aphids, scale insects, and the like. In one aspect of the invention, it relates to the provision of high boiling isoparaffinic polysulfides as ingredients of insecticidal compositions. In another aspect of the invention, it relates to the application of high boiling polysulfides, having predominantly a branched carbon skeleton and having the sulfide group attached to tertiary carbon atoms, to plants, at certain times, to combat plant insects, such as mites, red spiders, aphids, and the like. In still another aspect of this invention, there are provided plant spray compositions having miticidal activity comprising as an essential active ingredient thereof, a di-tert-dodecyl polysulfide in an aqueous carrier medium, and a minor amount of an emulsifying agent.

One of the major defects of many of the currently available insecticides is that, in spite of their general effectiveness, they are specifically without action or have very slight action against mites, for example, and other members of the class Arachnida. Also, in the art of controlling plant pests, the agents used must not only be effective in killing the pests or rendering them inactive but also must be without phytotoxic action on the host plant. This is very important, since many compounds have been tested and found effective against plant pests but they also exhibit herbicidal activity. Such materials are of no real economic value, since the prime purpose in destroying the plant pest or insect is to preserve the host.

Therefore, an object of this invention is to provide an improved insecticidal and fungicidal composition which is highly toxic to plant pests but which is substantially non-injurious to foliage. Another object of this invention is to provide insecticidal compositions which are simple to use but are highly effective against the various plant pests, such as mites, fungi, and the like, which destroy plant life. Another object of this invention is to provide the improved insecticidal compositions having miticidal activity useful as plant sprays.

Other aspects, objects, as well as the several advantages, of this invention are apparent from a study of the disclosure and the appended claims.

In accordance with the present invention, an emulsion spray composition having specific miticidal activity without phytotoxic effect is provided for deciduous and evergreen type plantings, as well as citrus trees, comprising, as the principal active ingredient thereof, a high boiling, oil type polysulfide having predominantly a branched carbon skeleton and having the sulfide group attached to tertiary carbon atoms, said polysulfide having a total of 16–32 isoparaffinic carbon atoms per molecule and said polysulfide boiling in the range of 600–800° F., together with a minor amount of an emulsifying agent and water.

More specifically, in accordance with the present invention, specific miticidal activity without phytotoxic effect is imparted to insecticidal compositions by dispersing a small proportion of a high boiling, long chain isoparaffinic polysulfide in a carrier medium, such as an aqueous solution, to form a stable emulsion of the polysulfide therein.

In accordance with a specific embodiment of the present invention, an effective aqueous emulsion spray having excellent insecticidal activity for the protection of plants, such as deciduous and evergreen type plantings, and citrus trees, against attack by the European red mite, red spider mite, citrus red mite, and fungi, by way of example, is provided which comprises a mixture containing, as the principal active ingredient thereof, a di-tert-dodecyl polysulfide, a minor amount of an emulsifying agent, and water.

As noted and discussed above, I have now discovered that certain oil type, high boiling polysulfides are effective plant spray compositions for combatting various plant insects without causing any undesirable injury to plant foilage. These compounds may be represented by the general formula $$RS_{(x)}R'$$

wherein R and R' represent branched chain alkyl groups, $(x)$ represents an integer in the range of 2 to 5 and wherein R and R' each contain at least 8 but not more than 16 carbon atoms and are not necessarily identical. Preferably, I utilize a high boiling polysulfide having predominantly a branched carbon skeleton having the sulfide group attached to tertiary carbon atoms. Typical compounds applicable to the present invention include di-tert-dodecyl disulfide, di-tert-dodecyl trisulfide and the like.

In using the active materials of the present invention, they may be applied in undiluted form, as concentrates, or in high dilution. They may be applied in undiluted form or as concentrates with the assistance of fog and similar apparatus to trees and other plants, as well as to other bases. Because of their effectiveness and to lessen cost and to facilitate distribution of the small amount of material necessary to obtain the desired results, they are, as a practical matter, usually applied in admixture with a carrier, preferably water. When used with carriers, either as concentrates or at high dilution, they may be applied with or without a wetting agent. Liquid carriers may be water, mineral oils, organic solvents, or other solvents or suspending agents. For general use on plants, the polysulfide material is usually applied as a water emulsion. The concentrates or diluted compositions of the present invention may also contain other miticidal, insecticidal and fungicidal agents, if desired. Further, the polysulfide materials of the present invention can be advantageously utilized as dormant oil sprays, as fungicides, and as base oils for both insecticides and fungicides.

The proportion of insecticidal or miticidal agent, that is, high boiling isoparaffinic polysulfide, employed in the compositions of my invention is very small and is generally in the order of about 0.1 to about 1 or more weight percent. As noted above, the extender is preferably water. Substantially any emulsifier may be used to hold the polysulfide in suspension, although an alkylated aryl polyether alcohol (Triton X–100) and a sodium salt of an alkyl aryl polyether sulfate (Triton X–301) are particularly effective. The miticide concentrate preferably contains from about 3 to about 15 percent by weight of surfactants based on the total weight of the concentrate. The concentrate can be prepared with a proper proportion of polysulfide and sufficient emulsifying agent, as previously stated, to yield the sprays as emulsions upon stirring with water.

The usefulness of the compositions of the present invention and the general method of application will be illustrated in the following example.

EXAMPLE I

Bearing apple trees infected with two-spot and McDanieli mites were treated during the month of August with spray solutions consisting of 1 ounce of di-tert-dodecyl disulfide or 1 ounce of di-tert-dodecyl trisulfide per gallon of water. The spray was applied to the trees by hand to give thorough wetting. The temperature at the time of application ranged from 80 to 82° F. Temperatures after application were constantly above 90° F. during the hot part of the day and down to the 70° F. mark at night. Generally clear skies prevailed during the time of the test. The counts on the mites were by careful hand lens observation. The effectiveness of these two spray solutions is presented in Table I.

*Table I*

|  | Average number of mites per leaf ||
| --- | --- | --- |
|  | before | after |
| di-tert-dodecyl disulfide | 59.2 | 6.6 |
| di-tert-dodecyl trisulfide | 31 | 1.3 |

The effectiveness of the polysulfides of the instant invention is clearly shown by the above tabulation. Further, no injury to fruit was found. The di-tert-dodecyl trisulfide appeared to cause some very slight injury to leaves. However, complications from injury to the leaves by the mites prior to spraying made it very difficult to assess. Thus, it can be seen from the above example that the spray composition of the present invention is particularly valuable in its combination of miticidal activity without phytotoxic action.

Reasonable variation and modification are possible within the scope of the foregoing disclosure and the appended claims to the invention, the essence of which is that certain high boiling polysulfides having predominantly a branched carbon skeleton and having the sulfide group attached to tertiary carbon atoms, as set forth, have been found to possess insecticidal activity and are particularly useful as plant sprays for combatting plant insects.

I claim:

1. A method for protecting a base against attack by mites which comprises placing between said base and said mites a film of a dispersion comprising, as the principal active ingredient thereof, 0.1 to 1.0 weight percent of a high boiling ditertiary alkyl polysulfide having from 2 to 5 sulfur atoms per molecule and alkyl groups containing from 8 to 16 carbon atoms in a carrier medium, said polysulfide boiling within the range of about 600 to about 800° F.

2. A method according to claim 1 wherein said active ingredient is di-tert-dodecyl disulfide.

3. A method according to claim 1 wherein said active ingredient is di-tert-dodecyl trisulfide.

4. A method for protecting plants against attack by mites which comprises applying to a plant infested with mites an aqueous spray which comprises a mixture containing, as a principal active ingredient thereof, 0.1 to 1.0 weight percent of a high boiling ditertiary alkyl polysulfide having from 2 to 5 sulfur atoms per molecule and alkyl groups containing from 8 to 16 carbon atoms, a minor amount of emulsifying agent, and water, said polysulfide boiling within the range of about 600 to about 800° F.

5. A method according to claim 4 wherein said active ingredient is di-tert-dodecyl disulfide.

6. A method according to claim 4 wherein said active ingredient is di-tert-dodecyl trisulfide.

References Cited in the file of this patent

UNITED STATES PATENTS

| 1,986,218 | Remy | Jan. 1, 1935 |
| 2,043,941 | Williams | June 9, 1936 |
| 2,451,411 | Roasch | Oct. 12, 1948 |
| 2,527,948 | Lyon | Oct. 31, 1950 |
| 2,529,355 | Schulze | Nov. 7, 1950 |
| 2,560,421 | Eby | July 10, 1951 |
| 2,723,910 | Goodhue | Nov. 15, 1955 |

OTHER REFERENCES

Roark: U.S. Dept. Agr., Bull. E-344, May 1935, pp. 22, 24 and 25.